United States Patent
Chotard

(10) Patent No.: US 7,429,172 B2
(45) Date of Patent: Sep. 30, 2008

(54) APPARATUS FOR FORMING COMPLEX SHEETS OF COMPOSITE MATERIAL BY HOT STAMPING AND TOOL FOR ITS IMPLEMENTATION

(75) Inventor: Florian Chotard, La Turballe (FR)

(73) Assignee: Airbus France, Toulouse (FR)

( * ) Notice: Subject to any disclaimer, the term of this patent is extended or adjusted under 35 U.S.C. 154(b) by 788 days.

(21) Appl. No.: 11/013,764

(22) Filed: Dec. 16, 2004

(65) Prior Publication Data

US 2005/0127566 A1    Jun. 16, 2005

(30) Foreign Application Priority Data

Dec. 16, 2003    (FR) .................................. 03 14725

(51) Int. Cl.
*B29C 51/18*    (2006.01)
*B29C 51/26*    (2006.01)

(52) U.S. Cl. .................. 425/521; 425/392; 425/398; 425/403

(58) Field of Classification Search .................. 425/502, 425/520–521, 390, 397–399, 403
See application file for complete search history.

(56) References Cited

U.S. PATENT DOCUMENTS 3,901,640 A * 8/1975 Tigner et al. ................. 425/403
4,397,629 A * 8/1983 Akutsu et al. ................ 425/392

FOREIGN PATENT DOCUMENTS

DE    742 682 C    12/1943
DE    4234002 A1 *  4/1994

* cited by examiner

*Primary Examiner*—Yogendra Gupta
*Assistant Examiner*—Thu Khanh T Nguyen
(74) *Attorney, Agent, or Firm*—Patterson, Thuente, Skaar & Christensen, P.A.

(57) ABSTRACT

An object of the invention is a method of forming by hot stamping pieces of complex sheeting, composed of a one-piece element comprising several parts of relatively low thickness arranged in different intersecting planes, proceeding from a blank composed of at least one layer of fibers, which have been pre-impregnated with a thermoplastic resin, in which said preheated blank is formed in an assembly composed of a punch and a die. The method includes the steps of a first phase, the part of said blank that is to comprise the bottom or analog of the piece to be obtained is pressed against the bottom of the die, then the second phase, the part or parts of the blank comprising the flanged edge or flanged edges of said piece are pressed against the sides of the die, the work piece that has been obtained in this way then being removed from the jig.

8 Claims, 3 Drawing Sheets ured structures or pieces with relatively thin wall elements, arranged in several planes to make, for example, a box, a housing, a box panel, said wall being formed from one or more components of mineral or synthetic fiber materials, for example: glass, silica, carbon or ceramic fibers, pre-impregnated with a suitable resin, especially a thermoplastic resin.

APPARATUS FOR FORMING COMPLEX SHEETS OF COMPOSITE MATERIAL BY HOT STAMPING AND TOOL FOR ITS IMPLEMENTATION

RELATED APPLICATION

The present application claims priority to French Application No. 03 14725 filed Dec. 16, 2003.

FIELD OF THE INVENTION

This invention relates to complex sheeting of composite material, more exactly to the production of shaped structures or pieces with relatively thin wall elements, arranged in several planes to make, for example, a box, a housing, a box panel, said wall being formed from one or more components of mineral or synthetic fiber materials, for example: glass, silica, carbon or ceramic fibers, pre-impregnated with a suitable resin, especially a thermoplastic resin.

BACKGROUND OF THE INVENTION

The conventional technique used to produce this type of piece consists in hot stamping a precut sheet blank, using a tool comprised of a die and a one-piece punch, which molds the blank against the walls of the die in a single pass.

The production of flanged edges with this type of tool poses problems.

Actually, during the downward motion of the punch into the die, the compaction of the blank acts on the sides of the punch between it and the die, producing friction, which entails problems in the bending zone of the blank and likewise in the flanged edges of the finished piece.

It is thus in the bending zone of the blank, where folding to 90 degrees generally occurs, that a phenomenon called squeezing-out occurs, which consists in stretching of the fibers with a reduction in the thickness of the wall of the blank, a tendency of the fibers to settle in the direction of the center of the die and expulsion of the impregnation resin toward the exterior.

This phenomenon is relatively weak if the length of the flanged edge is also relatively small, for example less than 30 mm. On the other hand, the friction is very strong. Moreover, the thinner the wall of the flanged edge, the more this squeezing-out phenomenon is significant.

At the location of the flanged edges, the poor conversion of the vertical forces of the punch into horizontal forces pressing the flanged edges can result in fiber confusion, sliding of the layers of the blank, local variations of thickness and deformation or twisting of the fibers of said flanged edges, as well as of the folding zones of the piece that has been formed in this way.

Finally, with this sort of tool, removal from the jig can entail some problems, due to the compaction of the flanged edges, and it is completely impossible to obtain edges with a tilt towards the interior.

The purpose of this invention is to eliminate the aforementioned difficulties.

SUMMARY OF THE INVENTION

To do this, the object of the invention is a process of forming by hot stamping pieces of complex sheeting composed of a one-piece element comprising several parts of relatively low thickness arranged in different intersecting planes, proceeding from a blank composed of at least one layer of fibers, which have been pre-impregnated with a thermoplastic resin, in which said preheated blank is formed in an assembly composed of a punch and a die, characterized in that in the first phase of downward motion of the punch into the die, the part of said blank that is to comprise the bottom or analog of the piece to be obtained is pressed against the bottom of the die by the first lower part 8 of the punch, then in the second phase of actuation of one or more lateral parts of the punch, the part or parts of the blank comprising the flanged edge or flanged edges of said piece are pressed against the sides of the die by rotation of said lateral parts around the hinge axes of said lateral parts to the lower part, the work piece which has been obtained in this way then being removed from the jig.

This process makes it possible to place and press the bottom of the work piece against the bottom of the die without affecting the physical integrity of the parts of the blank surrounding said bottom, which slide while swiveling on the peripheral internal edge of the die and come to rest opposite, at a short distance from the inner sides of the die during the downward motion of the punch, without being pressed by the latter against said sides of the die.

It is only during the second phase that the bent zone of the work piece and the flanged edge or flanged edges are in turn pressed against the die, thus eliminating or greatly reducing the adverse effects of the squeezing-out phenomenon in said bent parts and the physical perturbations found in the flanged edges that are obtained using conventional processes.

The object of the invention is also a tool for executing said process, composed of a punch and a die, characterized in that said punch is composed of the following:

a main body which moves uniaxially with respect to the die, a pressing assembly integral with said main body, comprising the following:

a first part with one molding face corresponding to said bottom part or analog of said work piece which is to be produced;

a second part with one or more molding faces corresponding to said flanged edges of the work piece, said second part is mounted so as to be able to move between two positions, the first, i.e. the expansion position, in which the molding faces of said first and second parts define a molding surface corresponding to the internal face of said work piece, and a second, i.e. the retraction position, in which said second part is set back relative to said first position, said second part being composed of pieces with a molding face, which corresponds to the inner sides of the work piece as well as to the coupling zone of the inner sides to the bottom, said pieces being hinged on said first part on the periphery of said first part, and means which are capable of the following:

maintaining said second part in the retraction position, causing passage into the expansion position as soon as possible upon contact of said blank against the bottom of the die.

This tool has the advantage of forming and pressing the sides of the future work piece and bent parts adjoining the bottom, after forming and the start of pressing of said bottom and in a progressive manner according to the kinematics of movement of the mobile parts of the punch, better handling of the work piece, and especially essentially suppressing the squeezing-out phenomenon in the angles and deformation of the fabric meshes of the layers and random slipping of the latter, ensuring much better uniformity of the thickness of said sides.

BRIEF DESCRIPTION OF THE DRAWINGS

Other characteristics and advantages derive from the following description of one embodiment of the tool of the invention, the description given by way of example only with regard to the drawings, in which.

DETAILED DESCRIPTION OF THE INVENTION

Figure 1:
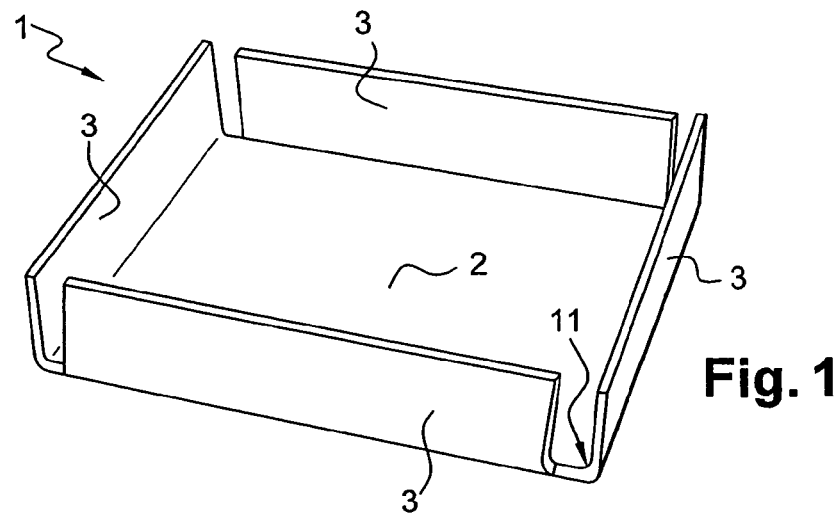
FIG. 1 shows an overhead perspective of a work piece of a piece of sheeting of composite material in the form of a box.

FIG. 1 shows a work piece of a piece of sheeting of composite material 1 in the general form of a cuboidal box, with a bottom 2 and four sides composed of flanged edges 3 which form a right angle with the bottom 2.

The work piece forms a one-piece assembly which has been made from an initial precut blank comprised of a stack of layers for example of fiberglass or carbon fiber fabric preimpregnated with a thermoplastic resin.

The invention relates to the formation of this type of piece by stamping, using a tool that includes a die matched to the external shapes and dimensions of the work piece 1 and a punch matched to the interior shapes and dimensions of said work piece.

Figure 2:
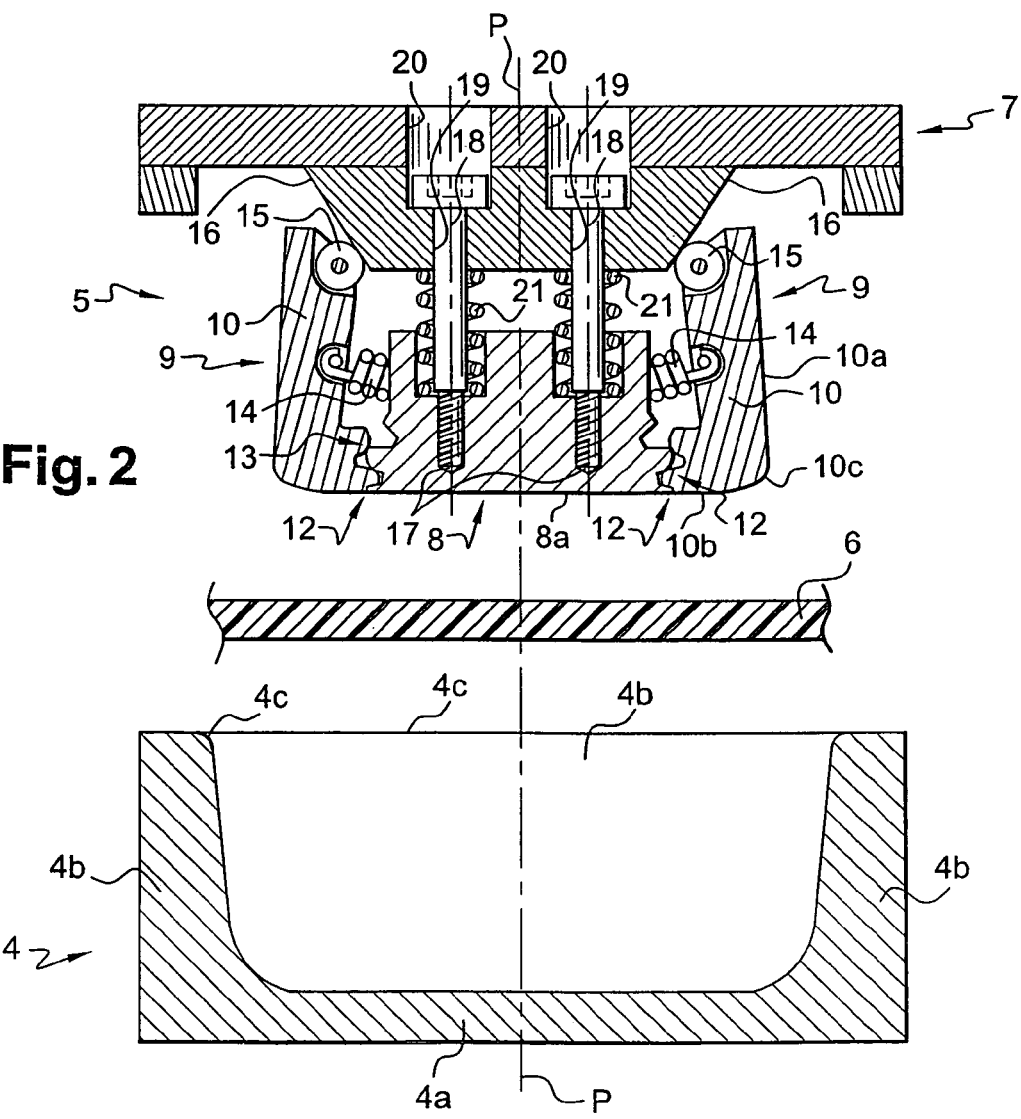
FIG. 2 shows a vertical, axial cross sectional view of the stamping tool as claimed in the invention, prepared for forming a blank.
Figure 3:
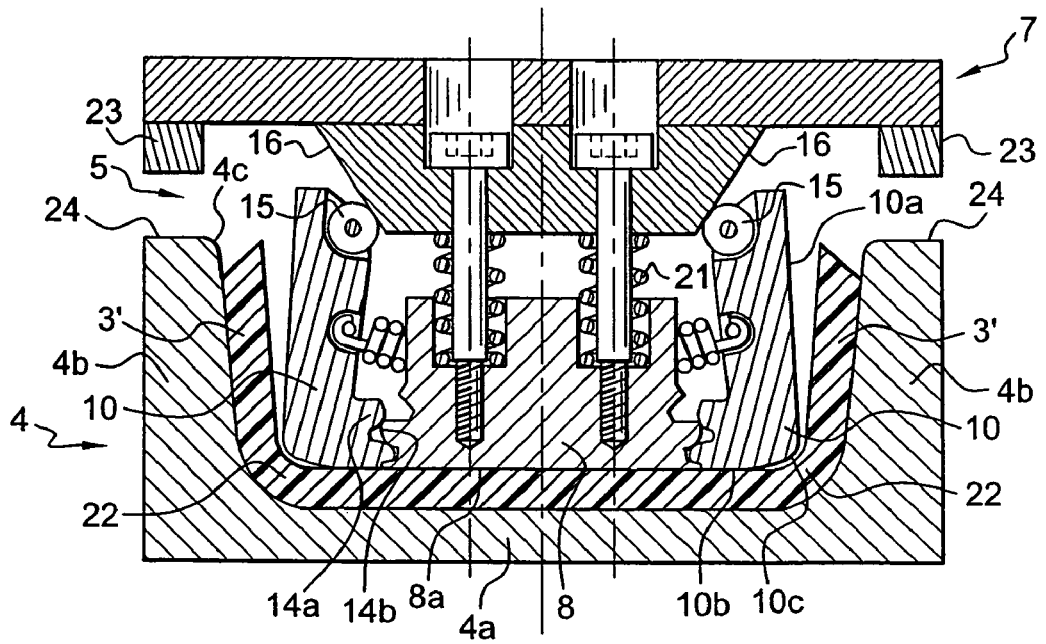
FIG. 3 shows the position of the punch of the tool at the end of the first phase of forming.

The tool as claimed in the invention, which is shown in FIG. 2, includes a die 4 which can be a conventional die, capable for example of yielding a work piece of the type of work piece 1. It comprises a bottom 4a of the die and the four sides 4b of the die which define an upper opening 4c of the die with a rounded edge.

The tool likewise comprises a punch 5, which has a particular structure capable of forming a preheated and precut blank 6 by stamping, which is intended to yield the work piece 1.

The punch 5 is composed of a main body 7 and a first, one-piece pressing part 8 formed by four pieces distributed around the center part 8.

The first part 8 has a rectangular molding face 8a shaped according to the center part of the bottom 2 of the work piece 1 which is to be produced.

Each piece 10 of the second molding part 9 corresponds to one flanged edge 3 of said work piece 1 and has a first molding surface 10a corresponding to the inner side of the edge 3, a second molding surface 10b corresponding to the perimeter of the bottom 2 and completing the surface 8a, and a third surface 10c for coupling between the surfaces 10a and 10b corresponding to the coupling zone 11 between the inner sides of the flanged edges 3 and the bottom 2 of the work piece 1.

The four pieces 10 are hinged on part 8 around the four horizontal axes which are orthogonal to the direction of movement P of the punch relative to the die 4. The position of said axes is located at 12 in FIG. 2, as near as possible to the separation zone between elements 8 and 10, on the periphery of the surface 8a. To this end, the parts with respect to the elements 8, 10 are shaped according to the segments of the intermeshing teeth 13 and allow rotation of the pieces 10 around said axes 12.

Thus the pieces 10 with a molding surface 10a, 10b, 10c, which corresponds to the inner sides of the work piece as well as to the coupling zone 22 of the internal sides to the bottom, comprise the second part and are hinged on said first part 8 on the periphery of said first part 8.

The pieces 10 are moreover held on the piece 8 by return springs 14.

At their top end, the pieces 10 are provided with one or more rollers, which form cams that can roll on the shaped, inclined cam paths 16 on the main body 7.

Finally, the piece 8 is mounted to slide on the axis P on the main body 7.

For this purpose, the piece 8 includes at least two holes 17 parallel to the axis P, in which screws 18 are screwed, which pass through the holes 19 made in the body 7.

The screw heads 18 are able to move in a recess 20 made on the upper surface of the body 7 with a bottom that acts as a stop for the screws, which are loaded by a compression spring 21 interposed between the piece 8 and said body 7.

FIG. 1 shows the punch 5 in the rest position, the pieces 10 in the retraction position, folded down nearer the axis P, the rollers 15 in contact with the cam paths 16 at their lower end.

This device works as follows:

The blank 6, which has been precut to define the flanged edges 3 and which has been placed on a film support (not shown), is heated and then placed above the die 4 and the punch 5 is pressed by the face 8a against the blank.

Figure 4:
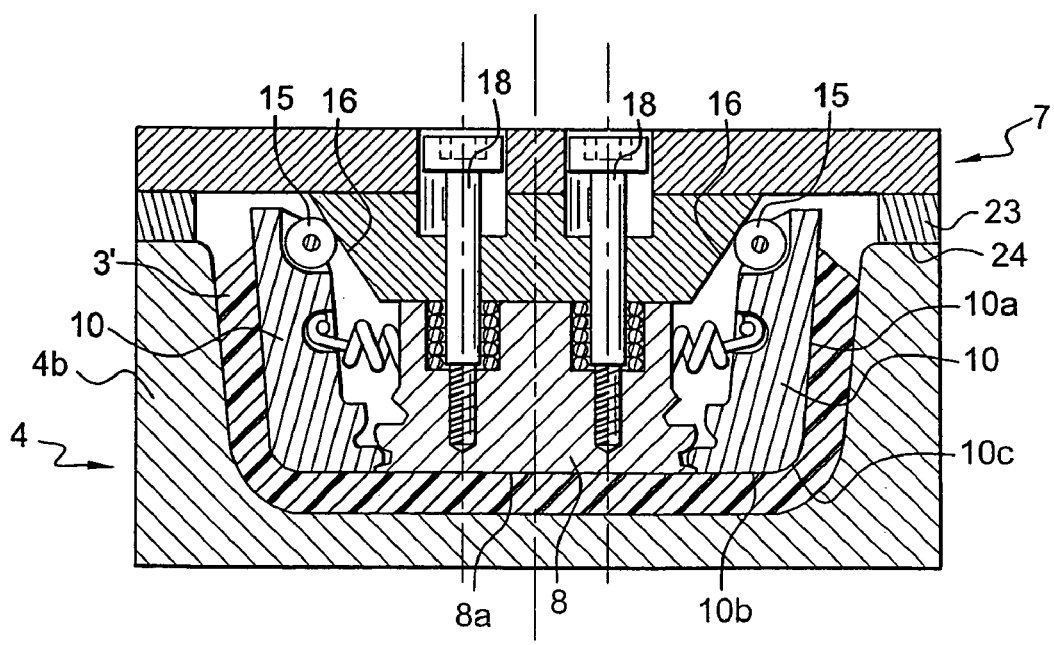
FIG. 4 shows the position of the punch at the end of the second phase.

According to the process as claimed in the invention, in the first phase, which is shown in FIG. 4, the punch is moved to press the center part of the blank 6 against the bottom 4a of the die, the pieces 10 being kept in the retracted position during this entire phase.

Thus, during the entire path of downward motion of the punch into the die, the faces 10a and a large part of the curved faces 10c remain at a distance from the upper surface of the blank 6 during deformation. The blank 6 swivels as it slides by its lower surface on the rounded edge 4c of the die during its downward motion in the latter, the parts of the blank which are to comprise the flanged edges 3 of the work piece 1 as well as the parts opposite the faces 10c not being subjected to compression, or only to very weak compression, and being gently and progressively drawn to a slight degree, without causing any damage.

During this motion, since the force of the springs 21 is greater than the resistance of the blank 6 to forming, the gap of the piece 8 relative to the body 7 is not reduced and the cam 15-cam path 16 system is then in the same position as at the beginning.

The part 8 thus presses the blank against the die until a pressing force is reached that exceeds that of the springs 21, thus starting, as the press continues to act on the punch 5, the second phase of pressing of the parts of the blank 3', which are to comprise the flanged edges 3 of the work piece 1, as well as the parts 22, which correspond to the coupling zones 11 of the work piece, by the pieces 10.

The latter are, in fact, beginning at this instant, forced to move toward the expansion position due to the proximity of the body 7 of part 8, which causes the rollers 15 to roll on the cam paths 16.

Thus, the process includes a first phase of downward motion of the punch into the die, the part of said blank 6, which is to comprise the bottom 2 or analog of the piece 1 to be produced, is pressed against the bottom 4a of the die 4 by a first lower part 8 of the punch 5, then a second stage of actuation of one or more lateral parts 10 of the punch 5, the part or parts of the blank 6 comprising the flanged edge or flanged edges 3 of said piece are pressed against the sides of the die by rotation of said lateral parts 10 around the hinge axes of said lateral parts on the lower part, the work piece that has thus been obtained then being removed from the jig.

FIG. 4 shows the end of this phase, with pieces 10 in the expansion position, the surfaces 8a, 10b, 10c, 10a then being located in a position corresponding exactly to an internal volume of the work piece 1 and being parallel to the inside wall of the die. A peripheral stop 23 of the body 7 interacts with the upper face 24 of the die 4 to limit the travel of the pieces 10 to the required amplitude, which can correspond to the body 7 coming into contact with the piece 8.

The stops 23, 24 thus limit the forces applied to the work piece by distributing the excess tonnage around the periphery of the die.

Thus the walls 2 and 3 of the work piece 1 are shaped and compacted twice, first the bottom 2, then the flanged edges 3.

The removal of the work piece from the jig is very simple, by a movement which is the reverse of retraction of the pieces 10, then extraction of the punch assembly from the die.

It should be noted that the process of the invention makes it possible to form in undercut, i.e. to achieve, in this case, flanged edges 3 that are slightly tilted toward the center of the bottom, accordingly matching the inner sides of the die and the pieces 10 and limiting their expansion travel by adjusting the stop 23, for example. Folding back the pieces when they are being retracted allows extraction of the punch without great difficulty. Of course, flanged edges 3 inclined toward the outside are thus possible; it is sufficient to control the amplitude of expansion of the pieces 10 accordingly, as in the case of an undercut.

It should also be noted that it is possible to set the start of expansion of the pieces 10 relative to the blank 6 coming into contact with the bottom 4a of the die. Then the expansion of the pieces 10 can only begin after a reduction in the thickness of the blank, which is determined under the pressure of the part 8. To do this it is sufficient to adjust the force of the springs 21 or the mutual positioning of elements 15-16.

The process of the invention solves the problems of squeezing-out of the zones that are subject to bending 22 and of the distortion of the fibers in the flanged edges 3; this makes it possible to form flanged edges with a length (or height) greater than that of the edges obtained according to conventional techniques and/or with a significantly lesser thickness.

The process entails other advantages such as:

reduction or suppression of the mouth-pore clogging, especially in parts 22, regular and uniform slippage of the layers of the flanged edges, good physical and uniform state, especially in the folding zones 22, absence of insufficient thickness, especially in said folding zones, outstanding stability of the work piece, which does not require, as in the case of conventionally obtained work pieces, phases of post-stamping restabilization in a cooling jig during full cooling of the work piece, the stability of the work piece moreover facilitates later machining processes of perforation and routing, the latter in particular can be done to the final dimensions by a water jet, for example, preservation of the support film of the blank, allowing re-use of the film, no need for oven preforming of the work piece, it is possible to produce work pieces without particular format limitations, especially pieces of great length with flanged edges (or bent up edges) greater than 90 mm.

The number of flanged edges 3 of the work piece 1 is optional, and may be less than or greater than four.

Figure 5:
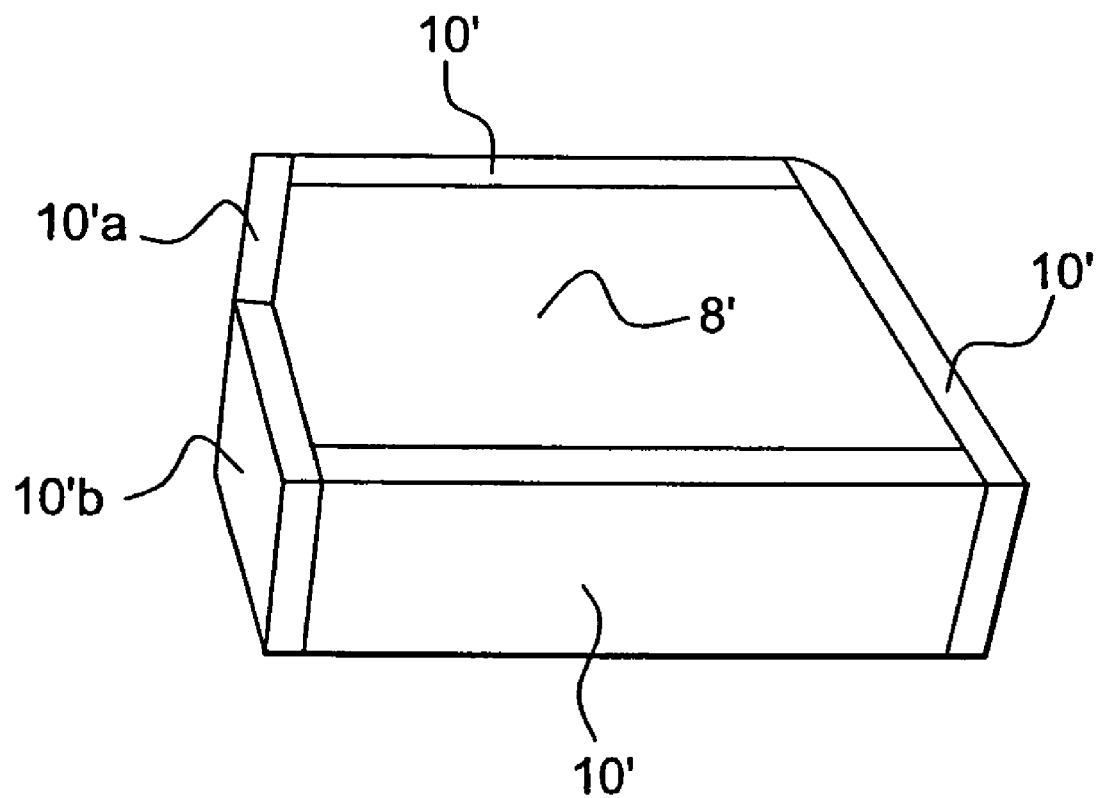
FIG. 5 shows one particular embodiment of a punch viewed in the reversed position.

FIG. 5 shows a punch 5 as claimed in the invention in the reversed position, on which the part of the bottom mold 8' that corresponds to the part 8 of FIG. 2 is apparent, three lateral molding pieces 10, corresponding to three of the pieces 10 of FIG. 2, and, on the fourth side of the punch, two pieces 'a and 10'b which are not coplanar, in order to implement a flanged edge for a roof section, the homologous side of the die of course having the same section.

The various pieces 10', 10'a, 10'b are hinged in the same way as the pieces 10 and are controlled in expansion by the inclined surfaces analogous to the surfaces 16, which can be inclined differently to obtain various inclinations of the flanged edges.

The invention claimed is:

1. A tool for forming pieces of complex sheeting by hot stamping, comprising:

a die; and a punch including a main body adapted to move uniaxially with respect to the die, a pressing assembly integral with the main body and comprising a first portion having a molding surface corresponding to a bottom portion of a work piece to be formed, a second portion having at least one molding surface corresponding to a flanged edge of the work piece, wherein the second portion is mounted to operably move between a first expansion position and a second retraction position, the molding surfaces of the first and second parts defining a primary molding surface corresponding to an internal face of the work piece in the expansion position, the second portion set back relative to the first position in the second position and comprising at least one part having a molding face comprising the at least one molding surface and corresponding to an inner side of the work piece and to a coupling zone of the inner sides to the bottom portion, the at least one part hinged on a periphery of the first portion, and means for maintaining the second portion in the retraction position, and means for initiating a transition into the expansion position upon contact of a blank against a bottom of the die.

2. A tool as claimed in claim 1, wherein the second portion comprises parts having molding faces corresponding to the inner sides of the work piece and to folded zones for joining the edges to the bottom, the parts hinged on the first portion proximate a periphery of a molding surface and elastically returned to the retraction position, and wherein the means for initiating a transition into the expansion position comprise a cam-cam path system, a cam arranged on one of the main body and the second portion, and a path arranged on the other of the main body and the second portion, and an assembly of the first portion on the main body sliding axially to the punch to operably actuate the cam-cam path system when the blank contacts the bottom of the die.

3. A tool as claimed in claim 2, wherein the assembly operably slides between the first portion on the main body and comprises a compression spring system adapted to return the first portion to a position of removal from the main body.

4. A tool as claimed in claim 1, further comprising an end position of descent of the punch including a stop integral with the main body and adapted to interact with the die.

5. A tool as claimed in claim 4, wherein the stop is adjustable.

6. A tool as claimed in claim 1, wherein an expansion amplitude of the second portion can be controlled to produce flanged edges that form an angle.

7. A tool as claimed in claim 6, wherein the angle is 90 degrees with the bottom portion of the work piece.

8. A tool as claimed in claim 5, wherein the flanged edges are undercut.

* * * * *